(12) United States Patent
Fukuda et al.

(10) Patent No.: US 8,636,491 B2
(45) Date of Patent: Jan. 28, 2014

(54) TIRE VULCANIZER

(75) Inventors: Hideki Fukuda, Tokyo (JP); Kunio Matsunaga, Tokyo (JP); Joji Yusa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/391,788

(22) PCT Filed: May 10, 2011

(86) PCT No.: PCT/JP2011/060715
§ 371 (c)(1),
(2), (4) Date: Feb. 22, 2012

(87) PCT Pub. No.: WO2012/114541
PCT Pub. Date: Aug. 30, 2012

(65) Prior Publication Data
US 2012/0251645 A1 Oct. 4, 2012

(30) Foreign Application Priority Data
Feb. 25, 2011 (JP) ................................ 2011-040726

(51) Int. Cl.
*B29C 33/24* (2006.01)
(52) U.S. Cl.
USPC .......................................................... 425/47
(58) Field of Classification Search
USPC ........................................... 425/34.1, 38, 47
See application file for complete search history.

(56) References Cited

U.S. PATENT DOCUMENTS

| 4,212,605 | A | * | 7/1980 | MacMillan | 425/47 |
| 4,332,536 | A | * | 6/1982 | Singh et al. | 425/47 |
| 4,453,902 | A | * | 6/1984 | Imbert | 425/47 |
| 4,563,139 | A | * | 1/1986 | Yokoyama et al. | 425/47 |
| 5,683,726 | A | * | 11/1997 | Mitamura et al. | 425/47 |

FOREIGN PATENT DOCUMENTS

| JP | 63-230307 A | 9/1988 |
| JP | 2000-317943 A | 11/2000 |
| KR | 10-2008-0080624 | 9/2008 |

OTHER PUBLICATIONS

International Search Report for PCT/JP2011/060715, mailed Aug. 2, 2011.
Notice of Preliminary Rejection mailed May 28, 2013 for corresponding Korean application No. 10-2012-7004516.
Notice of Allowance issued Nov. 12, 2013, corresponds to Korean patent application No. 10-2012-7004516.

* cited by examiner

*Primary Examiner* — James Mackey
(74) *Attorney, Agent, or Firm* — Kanesaka Berner & Partners, LLP

(57) ABSTRACT

The tire vulcanizer is featured by including a slide back mechanism configured such that the upper metal mold separated and lifted from the lower metal mold installed to be fixed to a base is moved by an operation of a movable carriage so as to reciprocate between a vulcanization position at which the upper metal mold is pressed toward the lower metal mold, and a waiting position at which the green tire can be carried in the lower metal mold and at which the cured tire can be carried out from the lower metal mold, and is featured in that the upper metal mold is attached below, via a squeezing cylinder mechanism, to a beam integrated with a tie rod which is vertically moved by an operation of a lifting/lowering cylinder along a guide hole provided in the movable carriage.

4 Claims, 6 Drawing Sheets

FULLY CLOSED STATE OF METAL MOLD

FULLY CLOSED STATE
OF METAL MOLD

FULLY CLOSED STATE OF METAL MOLD

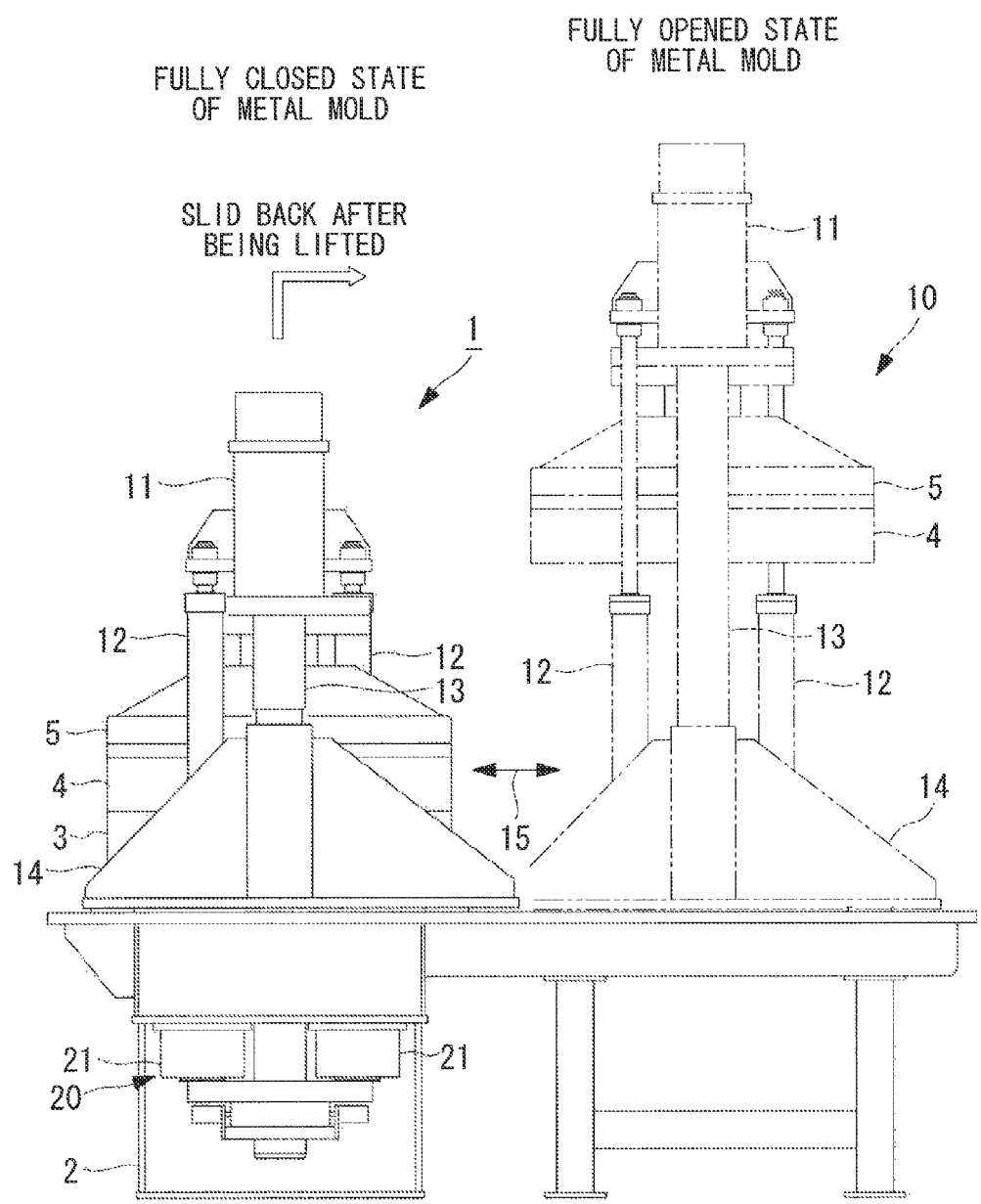

TIRE VULCANIZER

CROSS-REFERENCE TO RELATED APPLICATIONS

The present application is the U.S. National Stage of International Application No. PCT/JP2011/060715, filed on May 10, 2011; which application claims priority benefit of Japanese Application No. 2011-040726, filed Feb. 25, 2011.

TECHNICAL FIELD

The present invention relates to a tire vulcanizer which vulcanizes and molds a green tire.

BACKGROUND ART

A tire vulcanizer is an apparatus which puts, beforehand into a metal mold, a raw rubber tire (green tire) formed into a shape close to a shape of a cured tire and which applies heat and pressure to the green tire so that the green tire is finished to have the shape of the cured tire.

Among such tire vulcanizers, particularly among the tire vulcanizers which manufacture a large-sized tire having an outer diameter exceeding 1.5 m, there is an apparatus adopting a slide back structure in which an upper metal mold separated and lifted from a lower metal mold is moved to a waiting position in order that carrying-in of a green tire before vulcanization and carrying-out of a cured tire subjected to vulcanization can be easily performed.

FIG. 5 and FIG. 6 show a conventional structure of a tire vulcanizer adopting the slide back structure. The tire vulcanizer 1 is installed on a base 2 fixed onto a foundation. A lower metal mold 3, a lifting/sliding mechanism 10 of an upper metal mold 4, and a squeezing mechanism 20 are installed on the base 2.

The lifting/sliding mechanism 10 is a mechanism which vertically moves the upper metal mold 4, a bolster plate 5, and the like, that are supported by a beam 11, and which thereby performs switching operations between a fully closed position (lowered position) of the metal mold at the time of vulcanization and a fully opened position (lifted position) of the metal mold at the time when a tire is carried into and out from the metal mold. In this case, the lifting/lowering operations of the lifting/sliding mechanism 10 are performed by using a pair of lifting/lowering cylinders 12 as drive sources and by using a pair of left and right tie rods 13 as guides.

The lifting/sliding mechanism 10 can be moved by a movable carriage 14 in the horizontal direction shown by the arrow 15, so as to reciprocate between the vulcanization position (position concentric to the lower metal mold 3) corresponding to the fully closed state of the metal mold shown by the solid line in FIG. 6, and the waiting position which is shown by the imaginary line in FIG. 6, and to which, after the metal mold is fully opened, the upper metal mold 4 is slid back.

The squeezing mechanism 20 is an apparatus that pressurizes a green tire, which is placed between the upper and lower metal molds 3 and 4 at the time of vulcanization, by pulling down the upper metal mold 4 set at the fully closed position of the metal mold. The squeezing mechanism 20 is configured such that, when the tie rods 13 are pulled down by the operation of the squeezing cylinders 21 installed at a lower portion of the base 2, the upper metal mold 4 and the bolster plate 5 are pulled down together with the beam 11 and thereby the upper metal mold 4 is pressed toward the lower metal mold 3 fixed onto the base 2.

The squeezing cylinder 21 and the tie rod 13 are configured such that, when the lifting/sliding mechanism 10 is set at the position corresponding to the fully closed state of the metal mold, a clamp plate 13a in a clamp guide 22 on the side of the squeezing cylinder 21 is engaged with the tie rod 13, and thereby the tie rod 13 can be pulled down by the squeezing cylinder 21.

Therefore, after a green tire is vulcanized and molded in the fully closed state of the upper and lower metal molds 3 and 4, the metal mold is set in the fully opened state by lifting up the upper metal mold 4 by using the lifting/lowering cylinder 12 as shown by the imaginary line in FIG. 6, and further the upper metal mold 4 is slid back from the vulcanization position to the waiting position by the operation of the movable carriage 14. As a result, no obstacle exists above and around the lower metal mold 3, and hence a space for carrying the vulcanized tire out from the lower metal mold 3 and a space for subsequently carrying a green tire in the lower metal mold 3 are formed.

Further, Patent Literature 1 described below discloses a structure in which, in the state in which the upper metal mold is lifted together with the upper bolster, only the lower bolster can be moved from the vulcanization position in the substantially horizontal direction while the upper bolster is left at the lifted position.

CITATION LIST

Patent Literature

{PTL 1}
Japanese Unexamined Patent Application, Publication No. 2000-317943

SUMMARY OF INVENTION

Technical Problem

Meanwhile, the tire vulcanizer 1, which has the conventional structure described above and in which a tire is carried in and out from the lower metal mold 3 in the state where the lifting/sliding mechanism 10 is slid back to the waiting position, is configured such that, in the state where the lifting/sliding mechanism 10 is set at the vulcanization position, the squeezing cylinder 21 arranged at the lower portion of the base 2 pressurizes the green tire in the metal mold by pulling the tie rod 13. However, in such squeezing system, when the squeezing cylinder 21 arranged at the lower portion of the base 2 pressurizes the green tire in the metal mold by pulling the tie rod 13, the beam 11 which is pulled down at portions close to both ends thereof, and the tie rod 13 may be deflected.

This causes a problem that such deflection of the beam 11, and the like, makes non-uniform the squeezing force of the upper metal mold 4 which is lowered together with the beam 11 so as to press the lower metal mold 3 from the above.

The present invention has been made in view of the above described circumstance. An object of the present invention is to provide a tire vulcanizer which is configured such that a lifting/sliding mechanism is slid back to a waiting position, and which is featured in being capable of making uniform the squeezing force applied by an upper metal mold at the time of vulcanization.

Solution to Problem

The present invention adopts the following means in order to solve the above-described problem. A tire vulcanizer according to the present invention, in which a green tire is put into a metal mold capable of being separated into an upper metal mold and a lower metal mold and is then heated and pressurized so as to be finished into a shape of a cured tire, is featured by including a slide back mechanism configured such that the upper metal mold separated and lifted from the lower metal mold installed to be fixed to a base can be moved by an operation of a movable carriage so as to reciprocate between a vulcanization position at which the upper metal mold is pressed toward the lower metal mold, and a waiting position at which the green tire is carried in the lower metal mold and at which the cured tire is carried out from the lower metal mold, and is featured in that the upper metal mold is attached below, via a squeezing cylinder mechanism, to a horizontal beam integrated with a tie rod which is vertically moved by an operation of a lifting/lowering cylinder along a guide hole provided in the movable carriage.

The tire vulcanizer according to the present invention includes the slide back mechanism configured such that the upper metal mold separated and lifted from the lower metal mold installed to be fixed to the base can be moved by the operation of the movable carriage so as to reciprocate between the vulcanization position at which the upper metal mold is pressed toward the lower metal mold, and the waiting position at which a green tire is carried in the lower metal mold and at which a cured tire is carried out of the lower metal mold. Also, the tire vulcanizer according to the present invention is configured such that the upper metal mold is attached below, via the squeezing cylinder mechanism, to the horizontal beam which is vertically moved by the operation of the lifting/lowering cylinder along the guide member vertically provided at the movable carriage. Thereby, the upper metal mold can be uniformly pressed down at the time of vulcanization and molding of the green tire. That is, the squeezing cylinder mechanism according to the present invention presses the upper metal mold by squeezing the center portion of the upper metal mold from above, and hence it is possible to prevent non-uniform pressurization due to the deflection of the horizontal beam, and the like.

In the above-described invention, even when a plurality of the squeezing cylinder mechanisms are arranged, the upper metal mold can be uniformly pressed. In this case, it is preferred that the plurality of squeezing cylinder mechanisms are arranged uniformly on the same plane.

In the above-described invention, it is preferred to provide cooling means between the squeezing cylinder mechanism and the upper metal mold. Thereby, it is possible to prevent that the squeezing cylinder mechanism is heated by heat for heating the metal mold at the time of vulcanization. That is, an increase in the temperature of the oil, and the like, of the hydraulic cylinder used for the squeezing cylinder mechanism is prevented, and hence the reliability and durability of the squeezing cylinder mechanism is improved.

In the above-described invention, it is preferred that the squeezing cylinder mechanism includes a suspension member which is attached to the horizontal beam and by which the upper metal mold, set at the lifted position corresponding to the fully opened state of the metal mold, is supported in a suspended state. Thereby, when the upper metal mold separated and lifted from the lower metal mold is moved by the operation of the movable carriage so as to reciprocate between the vulcanization position and the waiting position, the dedicated suspension member supports the full weight of the upper metal mold, and hence the inertia force of the upper metal mold, which is a heavy article, can be prevented from acting on the squeezing cylinder set in a free state. Further, even when a thermal expansion difference is generated between the horizontal beam and a pressure receiving plate, a horizontal load can be prevented from acting on the squeezing cylinder.

Advantageous Effects of Invention

According to the present invention described above, the tire vulcanizer, having the configuration in which the lifting/sliding mechanism is slid back to the waiting position, is configured such that the squeezing cylinder is arranged above the upper metal mold so as to press down the upper metal mold. Thereby, it is possible to obtain a significant effect that a cured tire is manufactured by making uniform the squeezing force applied by the upper metal mold at the time of vulcanization and hence the quality of the cured tire is improved.

Further, the durability and reliability of the squeezing cylinder is improved by providing the cooling means for cooling the squeezing cylinder which receives thermal influence from the metal mold.

Further, the suspension member is provided as a tool exclusively used for suspending the upper metal mold. Therefore, even when the upper metal mold is reciprocated between the vulcanization position and the waiting position, the inertia force of the upper metal mold is prevented from acting on the squeezing cylinder in the free state. Further, even when a thermal expansion difference is generated between the horizontal beam and the pressure receiving plate, no horizontal load acts on the squeezing cylinder, and also thereby the durability and reliability of the squeezing cylinder is improved.

BRIEF DESCRIPTION OF DRAWINGS

FIG. 6 is a right side view of the tire vulcanizer shown in FIG. 5, in which view the fully closed state of the metal mold is shown by the solid line, and in which view a state where an upper metal mold is slid back after the full opening of the metal mold is shown by the imaginary line.

DESCRIPTION OF EMBODIMENTS

Figure 1:
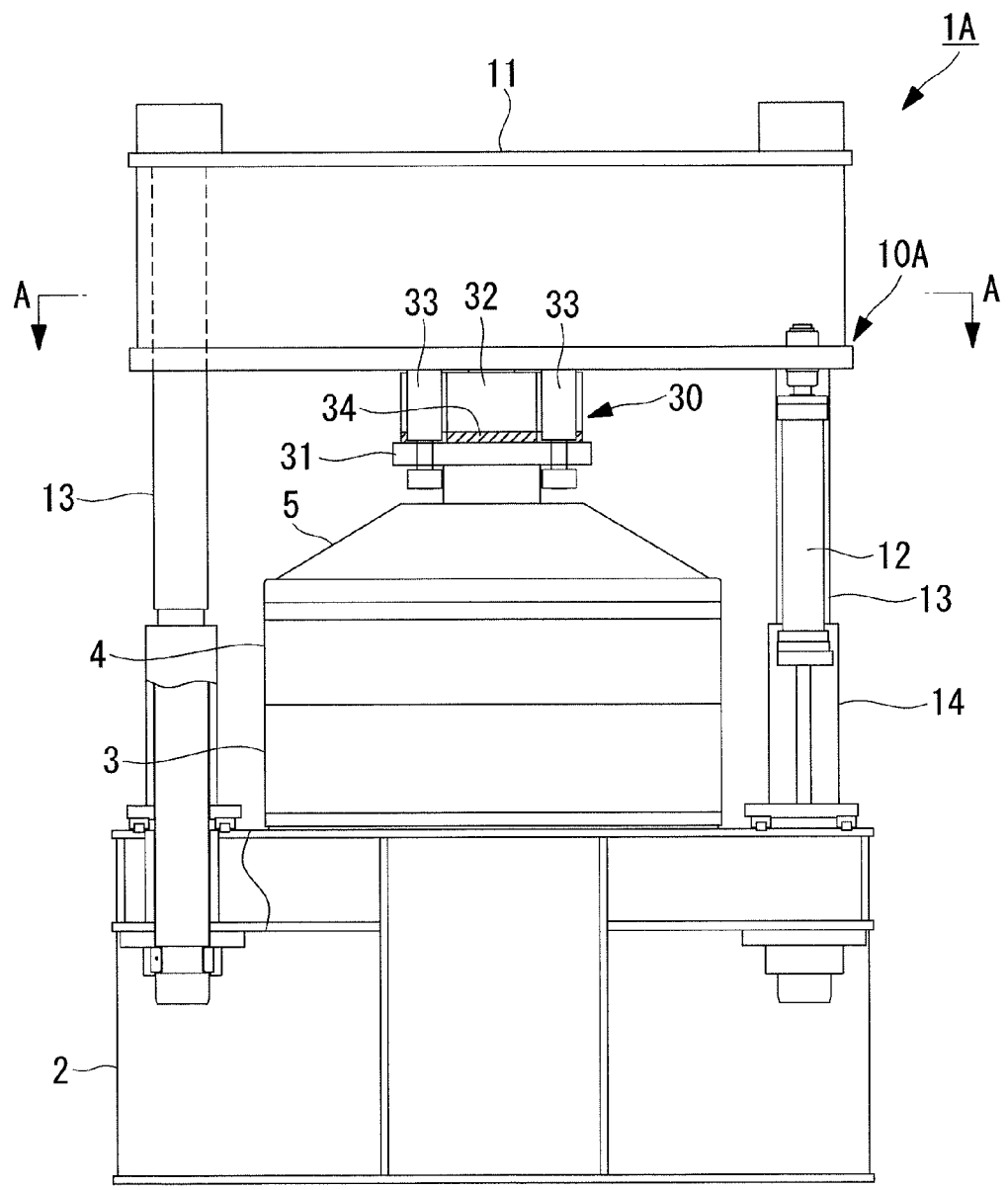
FIG. 1 is a front view showing a fully closed state of a metal mold, as an embodiment of a tire vulcanizer according to the present invention.

In the following, an embodiment of a tire vulcanizer according to the present invention will be described with reference to the accompanying drawings.

A tire vulcanizer 1A shown in FIG. 1 to FIG. 4 is an apparatus which vulcanizes and molds a green tire in such a manner that the green tire is put into a metal mold configured to be able to be separated into a lower metal mold 3 and an upper metal mold 4, and is then heated and pressurized so as to be finished to have a shape of a cured tire. Note that a bladder (not shown) is arranged in the metal mold to form the inner shape of the tire.

The tire vulcanizer 1A is installed on a base 2 fixed onto a base. The lower metal mold 3 fixed to the base 2, and a movable carriage 14 which can be moved to reciprocate in the horizontal direction are installed on the base 2. Note that a lifting/sliding mechanism 10A and a squeezing cylinder mechanism 30 of the upper metal mold 4 are installed on the movable carriage 14, so as to be able to be moved integrally with the movable carriage 14.

Figure 2:
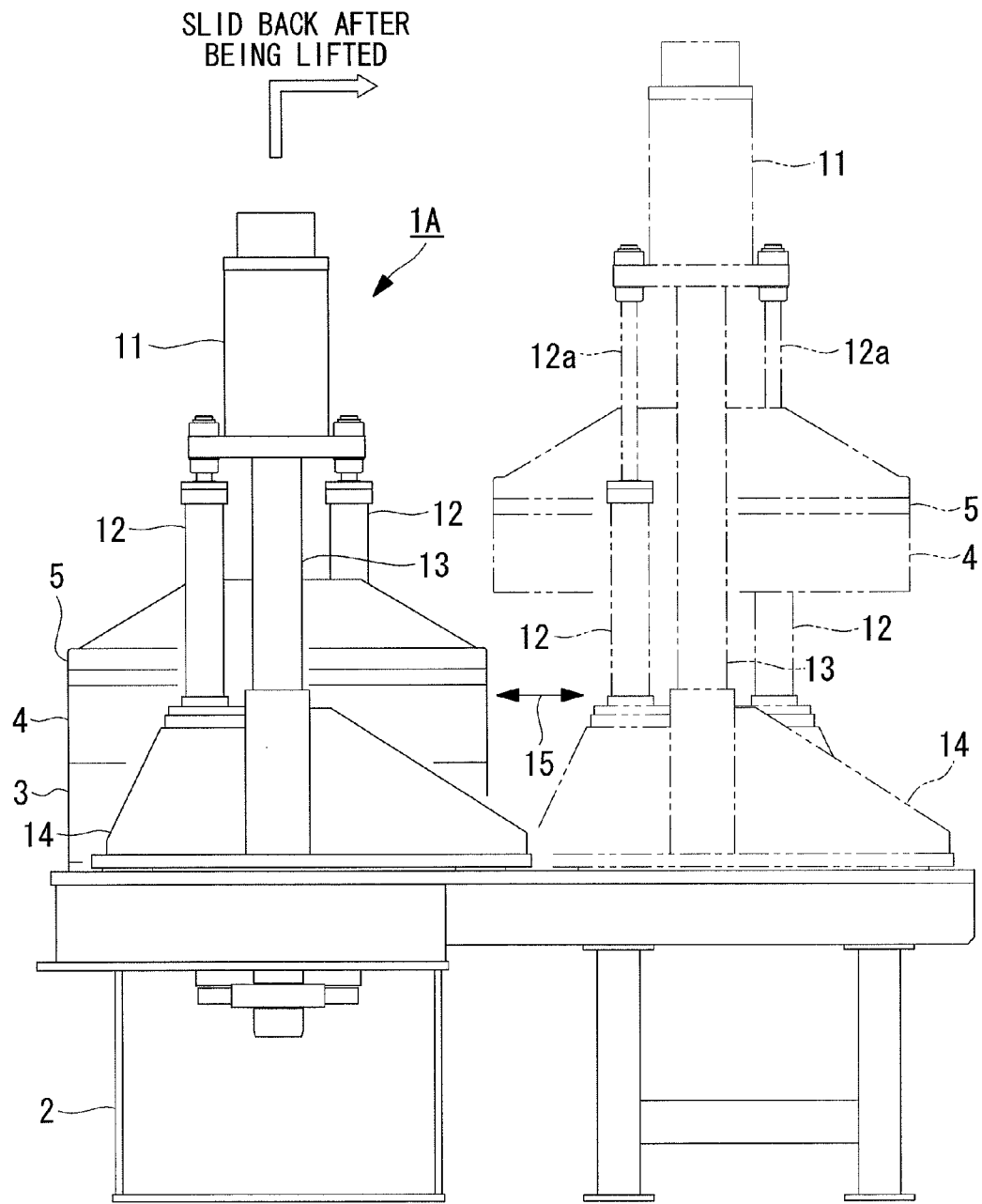
FIG. 2 is a right side view of the tire vulcanizer shown in FIG. 1, in which view the fully closed state of the metal mold is shown by the solid line, and in which view a state where an upper metal mold is slid back after the full opening of the metal mold is shown by the imaginary line.

Further, the tire vulcanizer 1A according to the present embodiment is provided with a slide back mechanism. The slide back mechanism is configured, for example, as shown in FIG. 2, such that the upper metal mold 4 separated and lifted from the lower metal mold 3 installed to be fixed onto the base 2 can be moved by the operation of the movable carriage 14 in the horizontal direction shown by the arrow 15, so as to reciprocate between a vulcanization position (shown by the solid line) which corresponds to a fully closed state of the metal mold and at which the upper metal mold 4 is pressed toward the lower metal mold 3, and a waiting positions (shown by the imaginary line) which corresponds to a fully opened state of the metal mold and at which a green tire is carried in the lower metal mold 3 and also a cured tire is carried out from the lower metal mold 3.

In this case, the upper metal mold 4 is reciprocated together with the lifting/sliding mechanism 10A and the squeezing cylinder mechanism 30 by the slide back mechanism.

The lifting/sliding mechanism 10A is a mechanism which vertically lifts and lowers the upper metal mold 4, a bolster plate 5, and the like, that are supported by a beam 11 as a horizontal member, and which thereby performs switching between the fully closed position (lowered position) of the metal mold at the time of vulcanization, and the fully opened position (lifted position) of the metal mold at the time of carrying-in of a green tire and at the time of carrying-out of a cured tire. In this case, the lifting and lowering operations of the lifting/sliding mechanism 10A are performed, for example, by using, as a drive source, each of a pair of left and right lifting/lowering cylinders 12, and by using, as a lifting/lowering guide of a tie rod 13, a hole which is provided in each of the pair of left and right movable carriages 14 so as to be located in the vicinity of the lifting/lowering cylinder 12.

The tie rods 13 respectively penetrate portions close to both ends of the beam 11 arranged in the horizontal direction and are fixed to the beam 11.

As the lifting/lowering cylinder 12, for example, a hydraulic cylinder is used. The lower end section of the lifting/lowering cylinder 12 is fixed to the movable carriage 14, and the upper end section of the lifting/lowering cylinder 12 is fixed to the beam 11. In the lifting/lowering cylinder 12 shown in the figures, a mounting structure is adopted in which, as in the configuration example shown in FIG. 2, a piston rod 12a is made to project upward so as to push up the beam 11, but the configuration of the lifting/lowering cylinder 12 is not limited to this.

That is, since a pair of holes for guiding the pair of left and right tie rods 13 are respectively provided in the movable carriages 14, and since the tie rods 13 respectively penetrate the portions close to both ends of the beam 11 so as to be fixed to the beam 11, the beam 11, which receives the pressing force from the lifting/lowering cylinder 12, is lifted and lowered by using, as guides, the holes of the movable carriages 14 which holes slidably support the tie rods 13, respectively.

Figure 3:
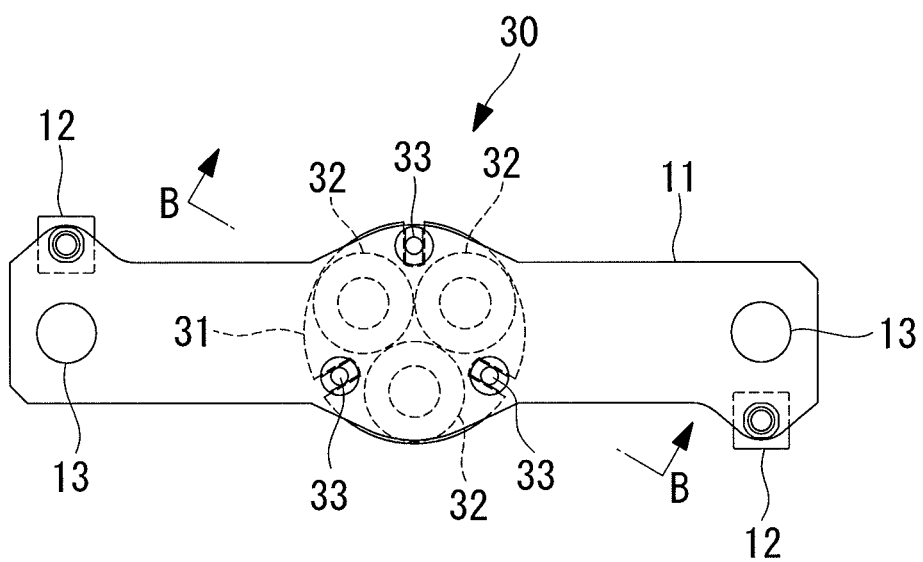
FIG. 3 is a sectional view taken along line A-A in FIG. 1 showing the tire vulcanizer.
Figure 4:
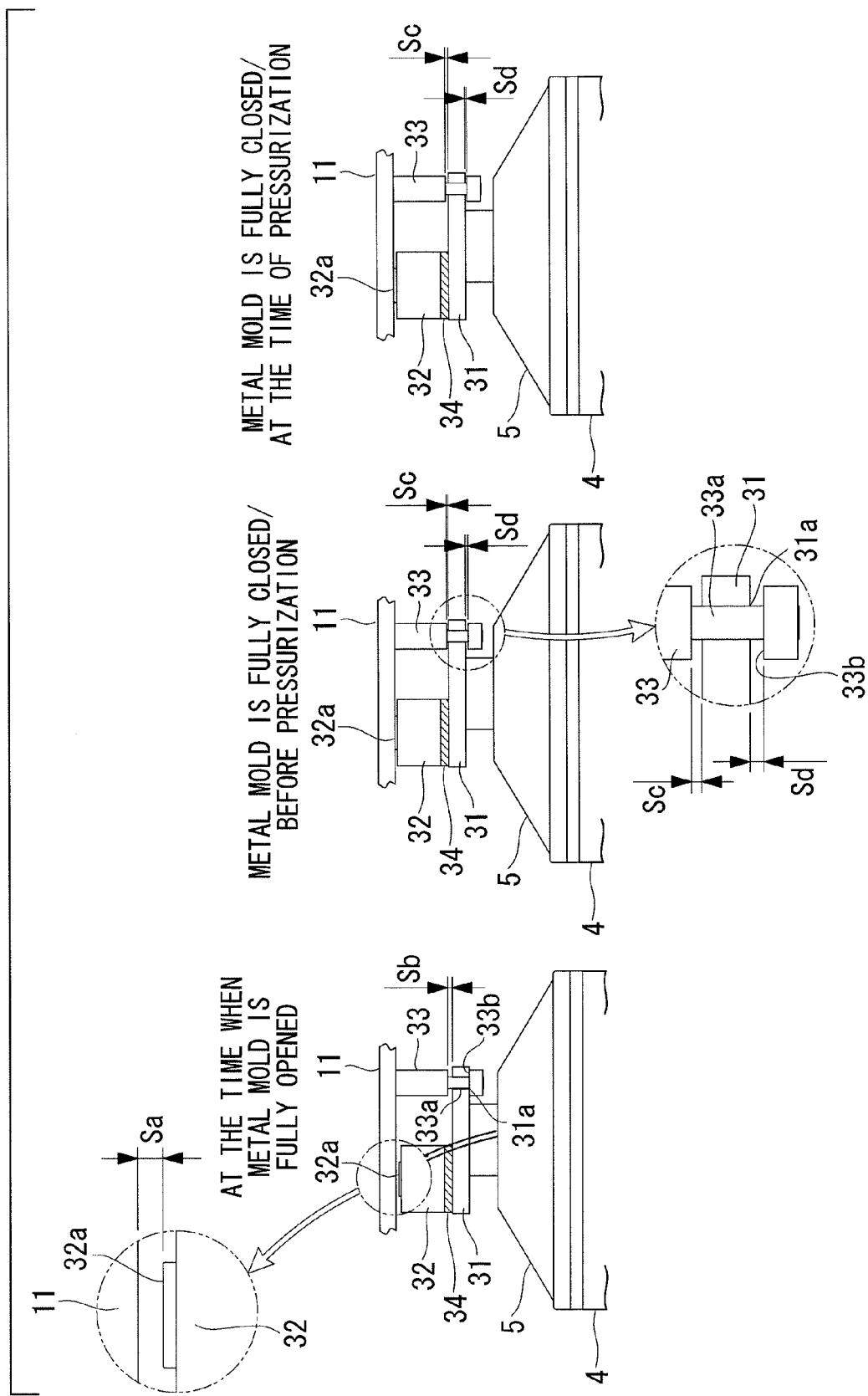
FIG. 4 is a sectional view which is taken along line B-B in FIG. 3, and in which a fully opened state of the metal mold, the fully closed state of the metal mold before pressurization, the fully closed state of the metal mold state at the time of pressurization are shown in order from the left side of the paper surface.
Figure 5:
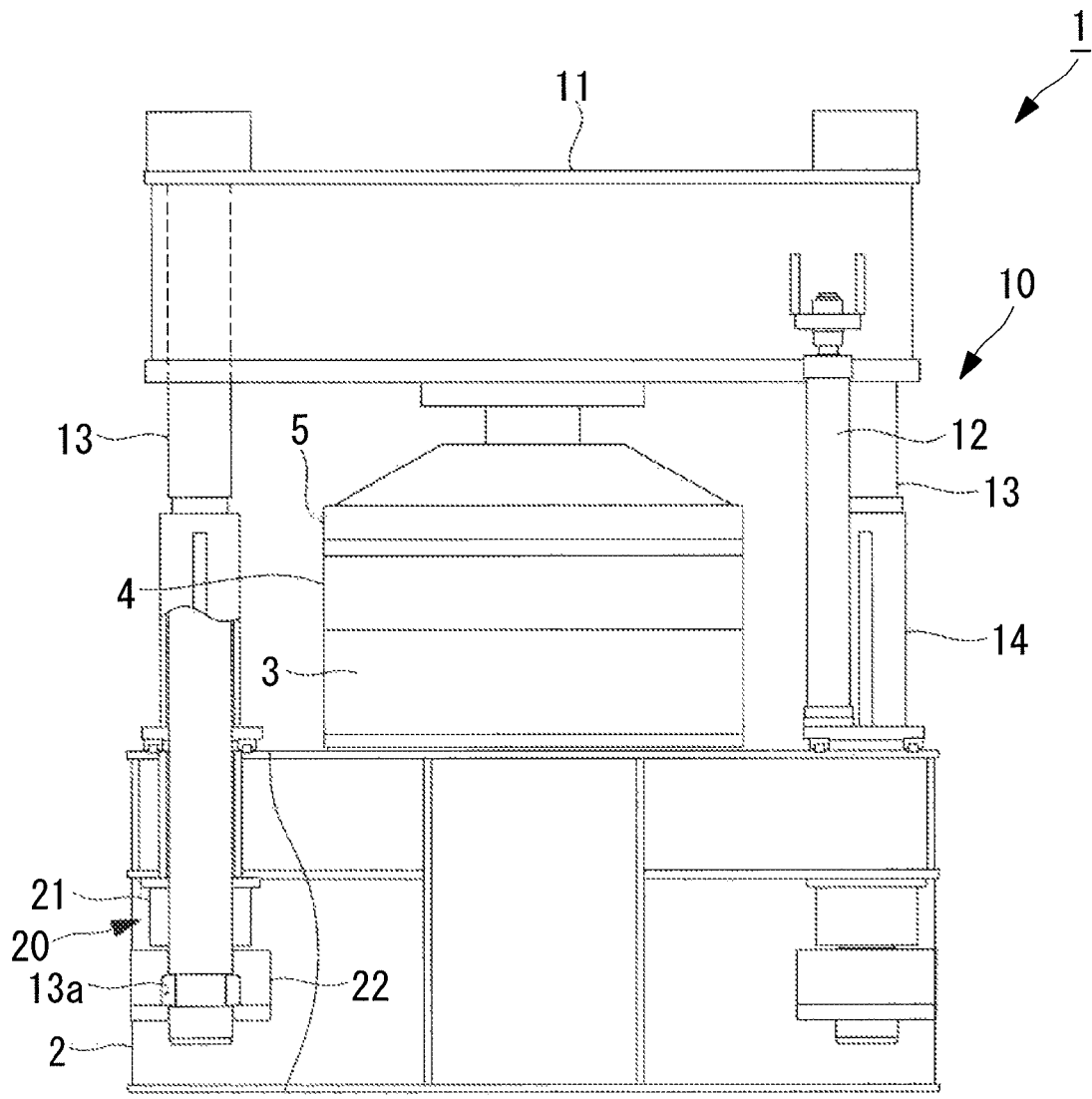
FIG. 5 is a front view showing a fully closed state of a metal mold of a conventional tire vulcanizer.

The squeezing mechanism 30 according to the present embodiment is provided on the lower surface side of the beam 11, as shown in FIG. 1 and FIG. 3.

The squeezing mechanism 30 is configured by including a pressure receiving plate 31 fixed to the upper end section of the upper metal mold 4, squeezing cylinders 32 installed to be fixed to the upper surface of the pressure receiving plate 31, and suspension rods 33 connecting between the pressure receiving plate 31 and the beam 11.

In the configuration example shown in the figures, the pressure receiving plate 31 is formed into a disc shape, and the three squeezing cylinders 32 are arranged at equal intervals in the circumferential direction of the pressure receiving plate 31. In this case, for example, a hydraulic cylinder is preferably used as the squeezing cylinder 32. Further, a cooling plate 34, through which a cooling medium such as, for example, water, is circulated, is arranged between the pressure receiving plate 31 and the squeezing cylinder 32, so as to prevent that the temperature of the squeezing cylinder 32 is increased by heat input from the upper metal mold 4 which is heated to a high temperature.

The squeezing cylinder 32 is installed to be fixed onto the pressure receiving plate 31 via the cooling plate 34, and a piston rod 32a is projected upward so as to push up the lower surface of the beam 11. In this case, at the time of the fully opened state of the metal mold shown in FIG. 4, a predetermined gap Sa is formed between the upper end surface of the piston rod 32a and the lower surface of the beam 11. That is, no squeezing force needs to be applied, and hence in the fully opened state of the metal mold in which state medium pressure, such as hydraulic pressure, is not supplied to the squeezing cylinder 32, the piston rod 32a of the squeezing cylinder 32 is separated from the beam 11. In other words, the piston rod 32a of the squeezing cylinder 32 is not brought into contact with the beam 11 at any time except the time of pressurization in the fully closed state of the metal mold.

At this time, the upper metal mold 4 and the squeezing cylinder 32 are in the state of being suspended by the suspension rod 33 from the lower surface of the beam 11. As shown in FIG. 3, a total of three suspension rods 33 are provided and alternately arranged with the three squeezing cylinders 32 at equal intervals in the circumferential direction of the pressure receiving plate 31.

Here, the suspension rod 33 is described specifically. The upper end side of the suspension rod 33 is fixed to and supported by the lower surface of the beam 11. Also, a small diameter section 33a, which passes through a through hole 31a formed in the pressure receiving plate 31, is provided on the lower end side of the suspension rod 33. Further, a holding surface 33b, which engages with the lower surface of the pressure receiving plate 31, is formed at the lower end portion of the small diameter section 33a. That is, in the fully opened state of the metal mold, the pressure receiving plate 31 connected integrally with the upper metal mold 4 and the squeezing cylinder 32 is suspended from the lower surface of the beam 11 in the state in which the load of the pressure receiving plate 31, the upper metal mold 4, and the squeezing cylinder 32 is received by the holding surface 33b formed at the lower end portion of each of the three suspension rods 33.

Further, the length of the small diameter section 33a of the suspension rod 33 is set to a length which forms a gap Sb longer than the projecting stroke of the piston rod 32a of the squeezing cylinder 32. That is, in the fully opened state of the metal mold in which state the holding surface 33b is brought into close contact with the lower surface of the pressure receiving plate 31 and receives the load of the pressure receiving plate 31, the upper metal mold 4, and the squeezing cylinder 32, the gap Sb is formed on the upper surface of the pressure receiving plate 31. The gap Sb is larger than the gap Sa formed above the piston rod 32a (Sb>Sa), and the gap Sa is longer than the projecting stroke of the piston rod 32a of the squeezing cylinder 32 (Sb>Sa>stroke).

In the case where the small diameter section 33a is provided so that the gap Sb is formed in this way, when the metal mold is set in the fully closed state by the operation of the lifting/lowering cylinder 12, the upper surface of the piston rod 32a is brought into close contact with the lower surface of the beam 11, so that the gap Sa is set to zero. At this time, the small diameter section 33a is projected from the upper and lower surfaces of the pressure receiving plate 31, and hence a gap Sc and a gap Sd are formed so that the small diameter section 33a is loosely fitted into the pressure receiving plate 31.

For this reason, even when the squeezing cylinder 32 is operated in the fully closed state of the metal mold, the pressing force of the squeezing cylinder 32 is not affected by the suspension rod 33.

Further, in the above-described structure in which the upper metal mold 4 is suspended by the suspension rod 33, when the beam 11 and the upper metal mold 4 are connected to each other by the squeezing cylinder 32, it is possible to prevent that a horizontal load is applied to the squeezing cylinder 32 due to the inertia force of the upper metal mold 4 at the time when the upper metal mold 4 is slid back by the movable carriage 14. Further, even when the thermal expansion difference is generated between the horizontal beam 11 and the pressure receiving plate 31, it is possible to prevent that a horizontal load is applied to the squeezing cylinder 32. That is, since when the upper metal mold 4 is slid back, the squeezing cylinder 32 is set in a free state, the squeezing cylinder 32 is subjected to no horizontal load and receives no influence of thermal expansion, and the like. Therefore, the squeezing cylinder 32 can be exclusively used to press the metal mold.

In this way, with the tire vulcanizer 1A, according to the present embodiment described above, that is configured such that the lifting/sliding mechanism 10A is slid back to the waiting position, and such that the squeezing cylinder 32 is arranged above the upper metal mold 4 so as to press down the upper metal mold 4, a cured tire can be manufactured by pressing the upper metal mold 4 with uniform pressing force at the time of vulcanization. Therefore, the tire vulcanizer 1A according to the present embodiment is effective to improve the quality of the cured tire.

Further, since the cooling plate 34 is provided as cooling means of the squeezing cylinder 32 which receives thermal influence from the upper metal mold 4, the temperature rise of hydraulic oil, the deterioration of a seal member, and the like, can be suppressed, and hence the durability and reliability of the squeezing cylinder 32 can be improved.

Further, the suspension member 33 is provided as an exclusive tool for suspending the upper metal mold 4, and hence, even when the upper metal mold is reciprocated between the vulcanization position and the waiting position, the inertia force of the upper metal mold is prevented from acting on the squeezing cylinder 32 in the free state. Further, even when a thermal expansion difference is generated between the horizontal beam 11 and the pressure receiving plate 31, no horizontal load is applied to the squeezing cylinder 32, and also thereby the durability and reliability of the squeezing cylinder 32 is improved.

Further, in the tire vulcanizer 1A configured such that the lifting/sliding mechanism is slid back to the waiting position, the upper metal mold 4 is reciprocated together with the lifting/sliding mechanism 10A and the squeezing cylinder mechanism 30 by the slide back mechanism. Therefore, when an operation to carry a green tire in the lower metal mold 3 and to set the green tire in the lower metal mold 3, an operation to take out a cured tire from the lower metal mold 3 and to carry the cured tire outside the lower metal mold 3, an exchanging operation of the metal mold, and a maintenance operation of the metal mold are performed, no obstacle exists around the lower metal mold 3, and hence the accessibility and workability are improved.

Note that the present invention is not limited to the above described embodiment, and can be suitably modified within the scope and spirit of the present invention.

REFERENCE SIGNS LIST 1 and 1A Tire vulcanizer
2 Base
3 Lower metal mold
4 Upper metal mold
  5 Bolster plate
10 and 10A Lifting/sliding mechanism
11 Beam (horizontal beam)
12 Lifting/lowering cylinder
13 Tie rod
14 Movable carriage
20 Squeezing mechanism
21 Squeezing cylinder
30 Squeezing cylinder mechanism
31 Pressure receiving plate
32 Squeezing cylinder
33 Suspension rod
34 Cooling plate

The invention claimed is:
1. A tire vulcanizer in which a green tire is put into a metal mold capable of being separated into an upper metal mold and a lower metal mold and is then heated and pressurized so as to be finished into a shape of a cured tire,
  the tire vulcanizer comprising a slide back mechanism configured such that the upper metal mold separated and lifted from the lower metal mold installed to be fixed to a base can be moved by an operation of a movable carriage so as to reciprocate between a vulcanization position at which the upper metal mold is pressed toward the lower metal mold, and a waiting position at which the green tire can be carried in the lower metal mold and the cured tire can be carried out from the lower metal mold,
  wherein the upper metal mold is attached below, via a squeezing cylinder mechanism, to a horizontal beam integrated with a tie rod which is vertically moved by an operation of a lifting/lowering cylinder along a guide hole provided in the movable carriage,
  wherein the squeezing cylinder mechanism comprises
    a pressure receiving plate,
    a squeezing cylinder which is fixed to an upper surface of the pressure receiving plate, and
    a suspension member connecting the pressure receiving plate and the horizontal beam,
  wherein the squeezing cylinder mechanism is arranged to press the upper metal mold downward,
  wherein the pressure receiving plate is fixed to an upper end section of the upper metal mold via a bolster plate,
  wherein the squeezing cylinder comprises a piston rod on an upper surface thereof, and wherein the piston rod is in contact with the horizontal beam and pushes up a lower surface of the horizontal beam, at the time of pressurization in the fully closed state of the metal mold.

2. The tire vulcanizer according to claim 1, further comprising cooling means provided between the pressure receiving plate and the squeezing cylinder.

3. The tire vulcanizer according to claim 1, wherein the suspension member is attached to the horizontal beam and the squeezing cylinder mechanism is configured such that, when the upper metal mold is set at a lifted position corresponding to a fully opened state of the metal mold, the upper metal mold is supported by being suspended by the suspension member.

4. The tire vulcanizer according to claim 1, wherein:
the tire vulcanizer is configured such that the piston rod of the squeezing cylinder is not brought into contact with the beam at any time except the time of pressurization in the fully closed state of the metal mold.

* * * * *